Patented June 26, 1934

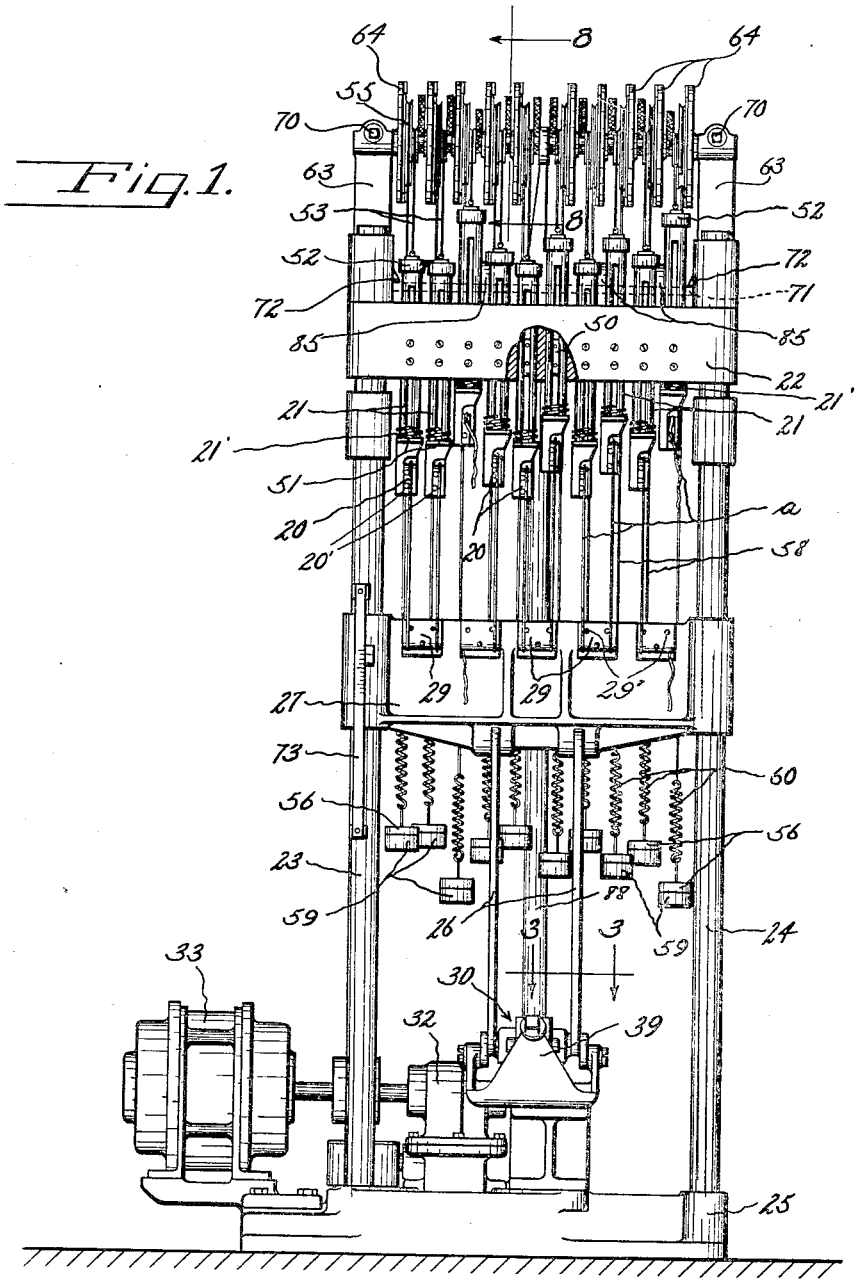

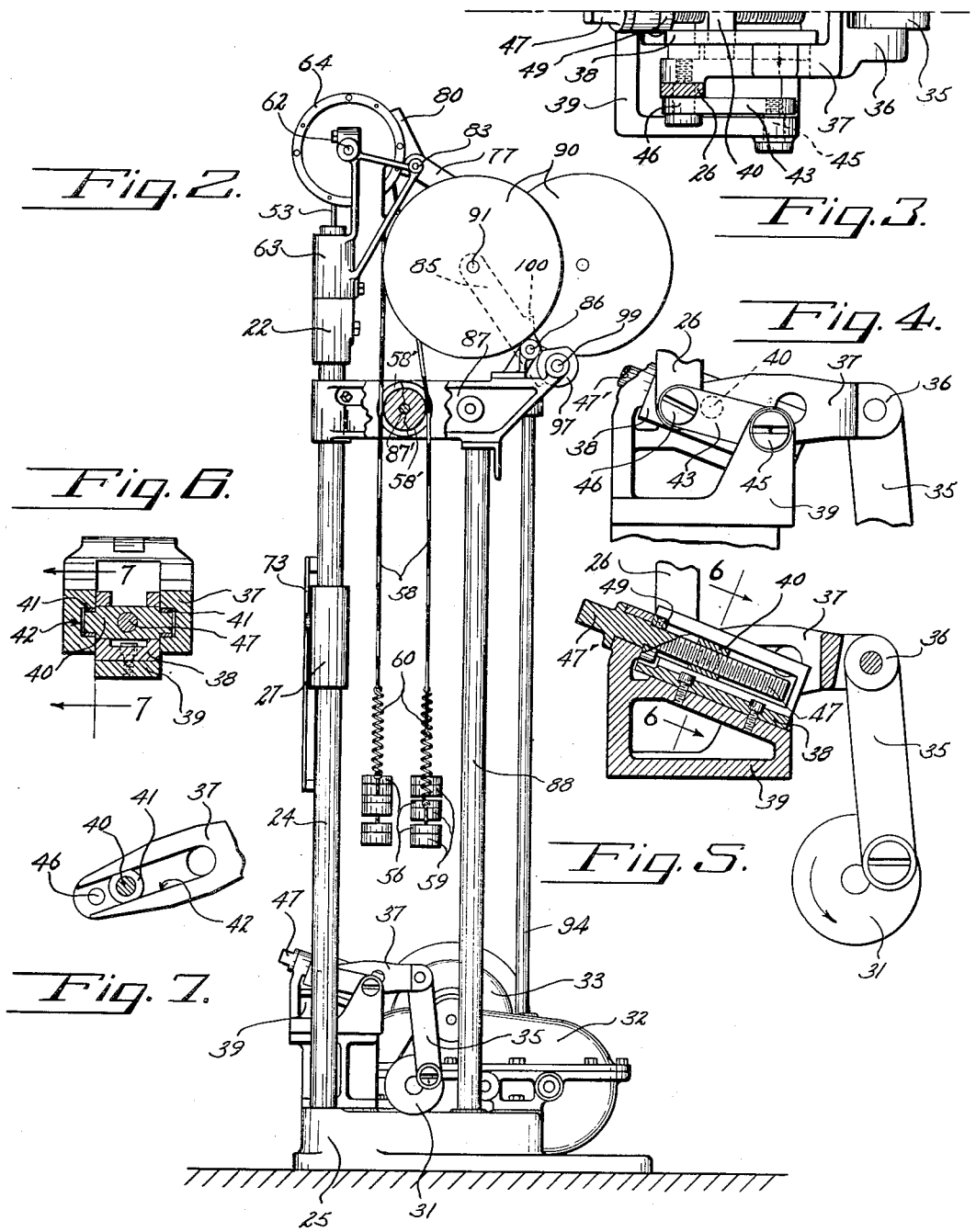

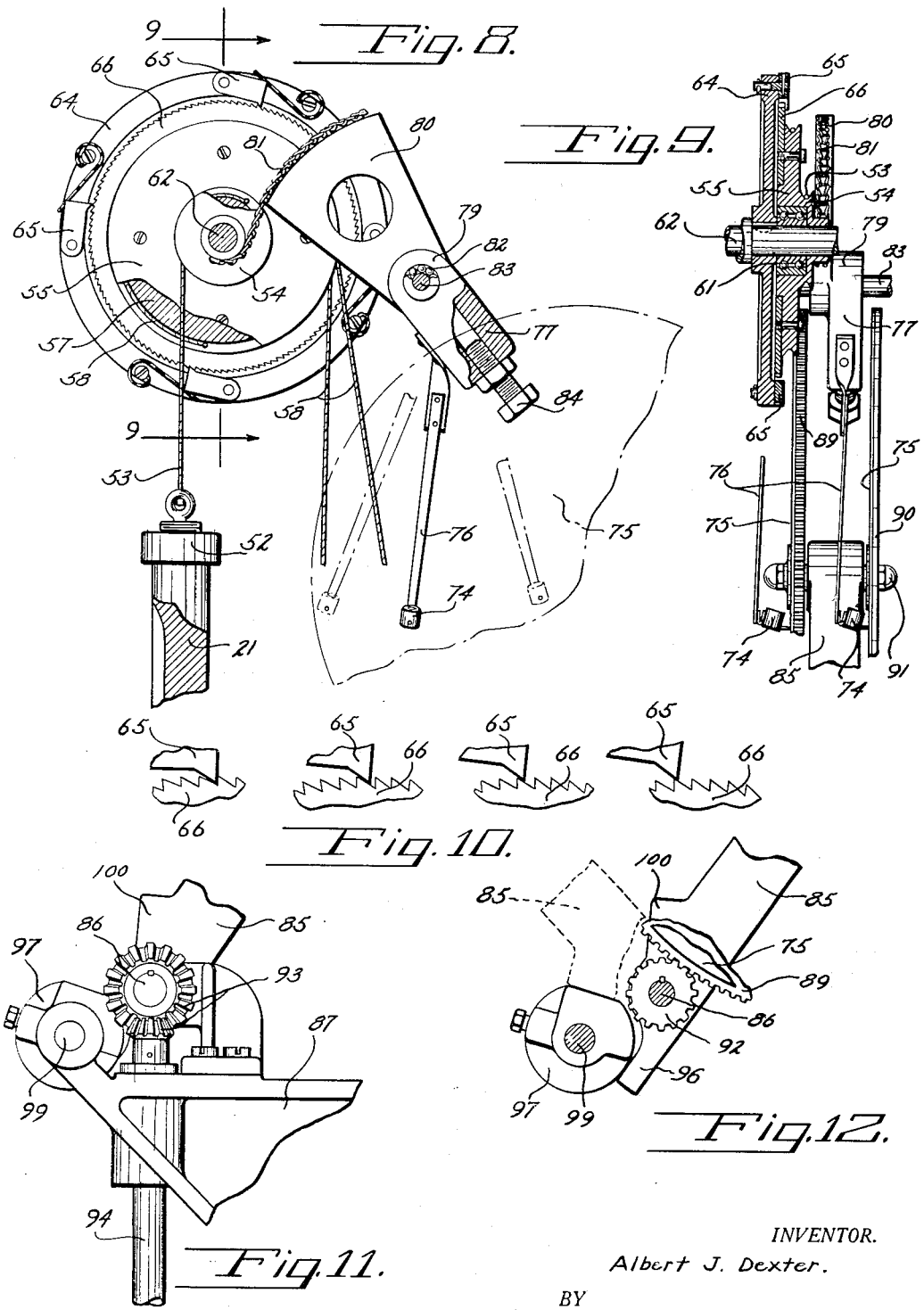

1,964,038

UNITED STATES PATENT OFFICE 1,964,038

TESTING MACHINE

Albert J. Dexter, East Springfield, Mass., assignor to The Fisk Rubber Company, Chicopee Falls, Mass., a corporation of Massachusetts Application March 19, 1930, Serial No. 437,099

3 Claims. (Cl. 74—14)

My invention relates to material testing machines and more specifically to a device for determining the repeated stress fatigue effects in elastic materials.

The object of the invention is to provide certain improvements in the device disclosed in an application filed June 8, 1929, Serial No. 369,296, by Martin Castricum, especially in respect to the means by which the amount of stress applied may be easily regulated. Other and further objects will be apparent from the following specification and claims.

In the drawings which illustrate one embodiment of my invention,

Fig. 1 is a front elevation of the testing machine;

Fig. 2 is a side view of the machine;

Fig. 3 is a detail view taken substantially on line 3—3 of Fig. 1 showing half of the adjusting mechanism to one side of the center line of the adjusting screw;

Fig. 4 is a side view of Fig. 3;

Fig. 5 is a sectional view of Fig. 4;

Fig. 6 is a view taken substantially on line 6—6 of Fig. 5;

Fig. 7 is a view taken on line 7—7 of Fig. 6;

Fig. 8 is a view taken substantially on line 8—8 of Fig. 1;

Fig. 9 is a view taken on line 9—9 of Fig. 8;

Fig. 10 is a diagrammatic illustration of a pawl and ratchet mechanism on the machine;

Fig. 11 is a detail view showing means of rotating the recording sheets; and

Fig. 12 is a view similar to Fig. 11, but with certain parts broken away.

In the drawings I have shown a device for simultaneously but independently testing a plurality of cords, such as are used in pneumatic tire casings, by submitting them to a repeated stress and relieving action. One end of cord lengths "a" are clamped, as by blocks 20, to slides 21 carried by a guide bracket 22 fixed to uprights 23 and 24 which are supported by a base 25. Blocks 20 are releasably held to slides 21 by screws 20'. Reciprocably mounted on the uprights and controlled in its movement by an operating link 26 is a crosshead 27 to which the cords "a" are also attached as by blocks 29 which are positioned directly opposite blocks 20. Blocks 29 are releasably held to crosshead 27 by screws 29'. As shown blocks 29 are each adapted to hold two cords, but it will be understood that blocks adapted to hold only one cord, or a plurality of cords, or varying width of strips, may be used.

When the slides 21 are held downward in the bracket 22 and the crosshead 27 is brought upward to the limit of its reciprocating movement, cord lengths "a" are positioned between the slides 21 and crosshead 27 by clamping the opposite ends of the cords beneath respective blocks 20 and 29 so that the cords are held taut by weights 59 but are otherwise unstressed, or, by the addition of more weights, placed under a predetermined load.

With the cord lengths "a" thus clamped the crosshead may be reciprocated. This reciprocating stroke, as well as the length of the stroke, is controlled by an adjustable stroke attachment 30 (Figs. 3 to 7) operated by a crank 31 on a speed reducing unit 32 driven from a motor 33. The crank movement is transmitted by a connecting rod 35 pivoted at 36 to one end of a rocker arm 37, the other end of which is pivoted to the operating links 26. The body of the arm 37 straddles a fulcrum guide 38 secured to a bracket 39 which acts as the base of the attachment and which is in turn fixed to the base 25 of the machine. A fulcrum pin 40 carried by the guide 38 is fitted with sliding bushings 41 (see Figures 6 and 7) at its ends which fit into guideways 42 in the arm 37.

A pair of guide arms 43 pivoted to the bracket 39 at 45 are pivoted at 46 to links 26 and arm 37. These guide arms 43 maintain the ends of links 26 at substantially the same position regardless of the adjustment of the attachment 30. An adjustment screw 47 held in place in the bracket 39 by a collar 49 is threaded through the pin 40. Screw 47 is provided with an extension 47' squared for the application of a wrench and turning this screw will vary the distance between the fulcrum pin 40 and the ends of the arm 37 by moving the pin 40 along the screw 47 upon which it is threaded. As the extent of the movement of the end 36 will always remain the same due to the action of the crank 31 a change in the distance between end 36 and fulcrum 40 will cause an inverse change in the movement of end 46; for example, an increase in the distance between 36 and fulcrum 40 will shorten the distance between 46 and fulcrum 40, thus shortening the amplitude of the pivotal movement of end 46 which is guided by links 43. By the above arrangement arm 37 oscillates about pin 40 which is held fixed in adjusted position by the screw 47.

The slides 21, which are held against rotation in the bracket 22 by keys 50 which allow the slides lengthwise movement in the bracket, are limited in their movement by stops 51 on the cord clamping ends of slides 21 and collars 52 on the other ends.

When cords or other similar materials are subjected to repeated stress and relief they will become fatigued and will elongate. In my machine, as the crosshead 22, which exerts this stress and relief, operates over a fixed path the increase in length of the cords is taken up by the slides 21. These slides are each operably attached, as by a light cable 53, to one sheave 54 of a pulley 55 (Figs. 8 and 9). Weights 56 are operably attached to another sheave 57 of the pulley 55 by cables 58 to counterbalance the weight of the slides 21, and to overcome the friction of pawls on a ratchet (later to be described), and additionl weights 59 are used to place a slight tension on the cords when they are relieved to keep the cords taut during the repeated stress and relief or to load them as previously described. To prevent the weights 56 and 59 from jerking as the crosshead is reciprocated light springs 60 are preferably added on the weight cables 58. The upward movement of the slides at the break is preferably cushioned as by springs 21'. To prevent the weights 56—59 attached to the several cables 58 from interfering with each other, the cables are held in staggered relation by pulleys 58' mounted on a shaft 87' supported in brackets 87.

The pulleys 55, of which there is one for each slide 21, are mounted as by ball bearings 61 for frictionless rotation on a pulley shaft 62 locked in brackets 63 carried at the upper end of uprights 23 and 24. Keyed to the shaft 62 are a number of pawl holders 64, one for each pulley 55, carrying multiple pawls 65 adapted to engage with ratchets 66 carried by pulleys 55. These pawls and ratchets are positioned to allow pulley rotation under action of the weights 59, thus allowing upward movement of the slides but preventing their downward movement. Thus, when the cords "a" are put under stress the pawls 65 will hold the ratchets 66 and pulleys 55 to which the ratchets are attached in locked position as the crosshead 27 moves downward and then, when the crosshead 27 again moves upward, giving the cords the desired relief, the pulleys 55 may be rotated enough by the weights 59 to take up any permanent elongation of the cords.

In operation the slides are brought downward so that the collars 52 are resting against the top of guide bracket 22. Since the pawls 65 hold the pulleys 55 against counter-clockwise rotation (as shown in Fig. 8), bolts 70 in brackets 63 may be loosened and the whole shaft 62, to which the pawl holders 64 are keyed, rotated to bring all the collars 52 in engagement with bracket 22. The slides 21 may then be held in this position by a bar 71 (shown by dotted lines in Fig. 1) adapted to be inserted under lugs 72 on brackets 63 and in engagement with the upper face of collars 52.

The lengths of cord "a" are then fastened between the opposed clamps 20 and 29 so that the cords are taut. The additional weights 59 of desired size are added to the counterweights 56 and the stroke of the crosshead 27 is regulated, this being gauged by a rule 73 fastened to the machine as on upright 23. When the bar 71, holding down the slides 21, is removed the motor may be started, thus starting the repeated stress and relieving of the cords. The pulleys 55 will be gradually rotated clockwise by the action of the weights 59 taking up the slack caused by the fatiguing of the cords "a". This movement will continue until the cords break whereupon the slides 21 will be brought to their upward limit by the weights 59. If found necessary or desirable to replace a cord during the running of the machine the pawls 65 of the particular slide to which the sample is to be attached may be released by forcing the pawls outwardly until their flat ends are engaged by their springs which then hold the pawls in disengaged position. The slide is then brought down to the crosshead 22, another sample fitted in place as previously described, and the pawls reengaged.

In order that the action of the cords under test may be recorded I provide pens 74 and recording sheets 75, the pens being actuated from the pulleys 55. The pens 74 are carried at the ends of brackets 76 secured to arms 77 of bell cranks 79, the other arms 80 of which are attached by means of chains 81 to the pulleys 55. The bell cranks 79, mounted on bearings 82 on a shaft 83 carried by brackets 63, are maintained just sufficiently out of balance on the side of the pens 74 to keep the chains 81 taut and for this purpose I provide bolts 84 in the arms 77 by which the degree of overbalance may be nicely adjusted. By this arrangement when the drums 55 are rotated by the weights 59 to take up the permanent elongation of the material being tested brackets 76 and pens 74 are moved in a counter-clockwise direction.

The recording sheets 75 engaged by the pens 74 are synchronized in their rotation by being operated from the reducing unit 32 as is the stroke attachment 30. A series of arms 85, pivoted on a pinion shaft 86 carried in brackets 87 secured to uprights 23, 24, and 88, carry the means by which the sheets 75 are held in engagement with the pens 74. A gear 89 on one side and a disk 90 on the other side of the arms 85 are fixed to shafts 91 carried by the arms 85, the sheets 75 being adapted to fit against the faces of the gears and disks. With reference especially to Fig. 9 it may be seen that one arm 85 is utilized to carry sheets for two adjacent pens 74. Pinions 92 keyed to shaft 86 mesh with the gears 89, the pinion shaft 86 being rotated through bevel gears 93 by shaft 94 operably connected to the speed reducing unit 32.

As the pulleys 55 are rotated by the changing of the position of the slides 21, due to the gradual lengthening of the cords "a", the pens 74 are correspondingly changed in their relation to the recording sheets 75 and thus leave a record of the cord action under repeated strain on the sheets. The time of the breaking of the cords will also be clearly defined as the slides 21 will rise, due to the weights 59, at the time of cord breakage, and pivot the bell cranks 79 so that the pens 74 are swung toward the center of the sheets 75.

To facilitate the positioning of the arms 85 and in order that the sheets 75 may be easily read without disturbing the position of the sheets with respect to the pens 74 and also for ease in changing the sheets I rest the arms 85 in recording position by engaging fingers 96 on the arms 85 against adjustable stops 97 on a shaft 99 carried by the brackets 87. Lugs 100 on the arms 85 are adapted to rest against the stops 97 when the arms are pivoted about the pinion shaft for the reading or changing of the sheets 75.

A machine constructed in accordance to my invention may be started with test samples and allowed to run without supervision, the action during the test together with the time of failure being individually recorded for each sample and the action of one sample not effecting the action of any other.

Although cords are shown on the machine as the material being tested it will be understood that rubber or other materials may equally well be the subject of the test and therefore the term "cord" when used in the specification is illustrative only.

Having thus described my invention, I claim:

1. In a device of the character described an adjustable stroke mechanism comprising a rotatable crank, a slotted fulcrum arm and means whereby the arm is operably connected at one end to the crank, a fixed guide, an adjustment screw, a fulcrum pin threaded on the screw and slidably held in the fixed guide, bearings rotatably held by the fulcrum pin and slidably mounted in the slot of the fulcrum arm, and means for guiding the unattached end of the fulcrum arm in a fixed path.

2. In a device of the character described an adjustable stroke mechanism comprising a rotatable crank, a slotted fulcrum arm and means whereby the arm is operably connected at one end to the crank, a fixed guide, a fulcrum pin slidably held in the guide, bearings rotatably held by the fulcrum pin and carried in the slot of the fulcrum arm, means for guiding the other end of the fulcrum arm in a fixed path, and means for changing the position of the fulcrum pin with respect to the effective ends of the fulcrum arm.

3. A stroke adjustment means for a testing machine which comprises a rotatable crank, a slotted arm and means whereby the arm is operably connected at one end to the crank, a guide, a pin slidably held in the guide, bearings rotatably held by the pin and carried in the slot of the arm, means for guiding the other end of slotted arm in a fixed path, and means for changing the position of the pin with respect to the effective ends of the arm as desired.

ALBERT J. DEXTER.